US009610526B2

United States Patent
Burns

(10) Patent No.: US 9,610,526 B2
(45) Date of Patent: Apr. 4, 2017

(54) FILTER MEDIA SUPPORT CORE

(71) Applicant: David Jack Burns, Mineral Wells, TX (US)

(72) Inventor: David Jack Burns, Mineral Wells, TX (US)

(73) Assignee: PECOFacet (US), Inc., Mineral Wells, TX (US)

(*) Notice: Subject to any disclaimer, the term of this patent is extended or adjusted under 35 U.S.C. 154(b) by 0 days.

(21) Appl. No.: 14/862,397

(22) Filed: Sep. 23, 2015

(65) Prior Publication Data

US 2016/0096133 A1 Apr. 7, 2016

Related U.S. Application Data

(60) Provisional application No. 62/058,237, filed on Oct. 1, 2014.

(51) Int. Cl.
  *B01D 46/00* (2006.01)
  *B01D 46/24* (2006.01)

(52) U.S. Cl.
  CPC ....... *B01D 46/0005* (2013.01); *B01D 46/003* (2013.01); *B01D 46/0024* (2013.01); *B01D 46/2403* (2013.01); *B01D 2265/06* (2013.01)

(58) Field of Classification Search
  CPC .......... B01D 46/0005; B01D 46/0024; B01D 46/003; B01D 46/24; B01D 46/2403; B01D 46/2411; B01D 46/2414
  See application file for complete search history.

(56) References Cited

U.S. PATENT DOCUMENTS

| | | | |
|---|---|---|---|
| 3,738,089 A * | 6/1973 | Brill | B01D 46/0087 181/231 |
| 6,168,647 B1 | 1/2001 | Perry, Jr. et al. | |
| 6,332,987 B1 * | 12/2001 | Whitney | B01D 17/045 210/315 |
| 7,108,738 B2 | 9/2006 | Burns et al. | |
| 2005/0172590 A1 | 8/2005 | Burns et al. | |
| 2011/0006015 A1 | 1/2011 | Leonard et al. | |
| 2012/0210688 A1 | 8/2012 | Burns et al. | |
| 2013/0062273 A1 | 3/2013 | Burns et al. | |

FOREIGN PATENT DOCUMENTS

WO    WO 2014/066035 A2    5/2014

* cited by examiner

*Primary Examiner* — Robert Clemente
(74) *Attorney, Agent, or Firm* — Reinhart Boerner Van Deuren P.C.

(57) ABSTRACT

A single support core for a filter media assembly. The single support core includes a single longitudinal tube extending between a first end and a second end. A plurality of orifices are defined in the tube, the orifices align circumferentially along the longitudinal length of the tube. A first plurality of portions defined between the first end and an intermediate annular ring joint and a second plurality of portions defined between the intermediate annular ring joint and the second end. The orifices in each of the first portions and second portions are equidistance circumferentially from each other defining rings. The rings are equidistant longitudinally from each other in each of the portions and the rings are longitudinally spaced differentially in the adjacent portions. The plurality of orifices direct fluid flow through the tube to yield a high flow velocity in predetermined areas along the length of the filter assembly.

34 Claims, 4 Drawing Sheets

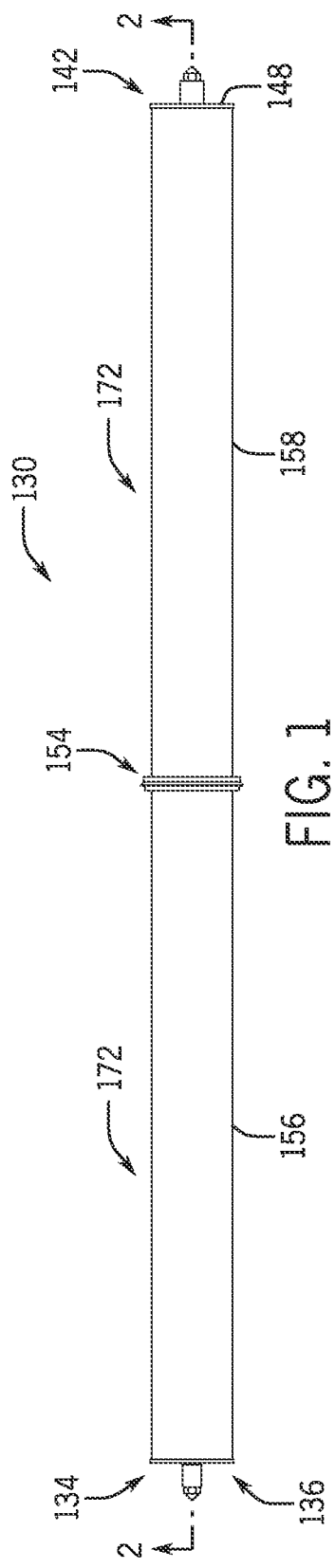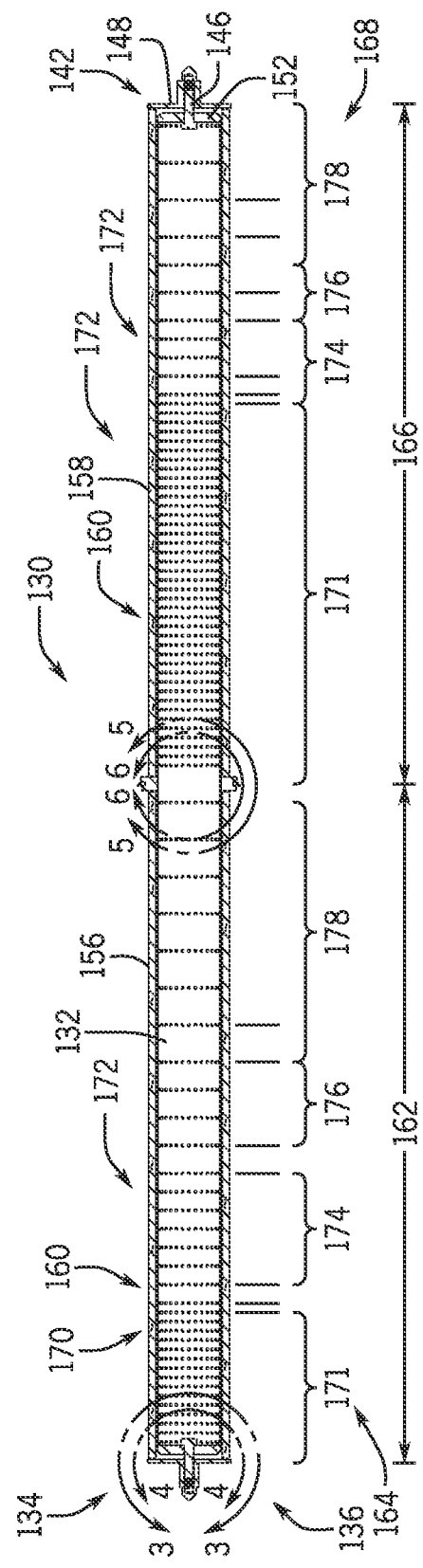

FILTER MEDIA SUPPORT CORE

CROSS-REFERENCE TO RELATED PATENT APPLICATIONS

This patent application claims the benefit of U.S. Provisional Patent Application No. 62/058,237, filed Oct. 1, 2014, the entire teachings and disclosure of which are incorporated herein by reference thereto.

FIELD OF THE INVENTION

The present invention relates generally to separator/coalescer vessels and filter elements for such vessels, and more particularly to a filter media support member that is re-useable.

BACKGROUND OF THE INVENTION

Filter elements for separating solids and liquids from fluid streams, for example oil wells, are generally known in the prior art.

Filtration vessels and coalescers are generally known in the prior art such as shown in U.S. Pat. No. 6,168,647 to Perry Jr. et al.; U.S. Publication Number 2012/0210688 to Burns et al.; U.S. Publication Number 2013/0062273 to Burns et al.; and U.S. Pat. No. 7,108,738 to Burns et al., the entire disclosures of each of these references being incorporated by reference as the different aspects of the present invention may be employed and improvements apply to these prior known filtration vessels and coalescing systems.

Certain aspects are also particularly applicable to a two stage filtration system such as shown in the '647 patent and the '688 publication. These particular types of filtration vessels are known and presently sold under the name GEMINI available from PECOFacet, a CLARCOR company located in Mineral Wells, Tex. Generally, in these types of systems, a gaseous fluid such as natural gas or other industrial gases are forced through different filter stage elements at high pressure allowing for various contaminant removal from the gaseous fluid. Oftentimes, the removal involves removal of oils and other hydrocarbons including crude oil for example, that may be entrained as droplets within the gas stream. It is quite desirable to obtain a high efficiency of removal of such matter while satisfying sufficient flow and production rates through the vessel, especially when filter media becomes clogged.

Currently, with many of the production sites, there are radical hydrocarbons that are a lot harder to coalesce such as in the fracking regions and certain oil and gas production regions. While GEMINI vessels existing such as covered by the aforementioned '688 and '647 patents or publications provide for a certain amount of filtration and capabilities, further improvements are discussed herein.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

BRIEF SUMMARY OF THE INVENTION

The disadvantages and limitations of the background art discussed above are overcome by the present disclosure.

There is disclosed a filter assembly. The filter assembly includes a single support core extending between a first end and a second end. A first end cap arrangement is operatively releasably secured to the first end of the single support core. A second end cap arrangement is operatively releasably secured to the second end of the single support core.

The single support core includes an intermediate annular seal positioned axially on the single support core between the first and second ends.

A first filtration stage of filter media is releasably mounted to the single support core sealed between the first end cap arrangement and the intermediate seal. A second filtration stage of filter media is releasably mounted to the single support core sealed between the second end cap arrangement and the intermediate seal.

In another embodiment, the filter assembly includes a first attachment mechanism proximate the first end of the single support core and a second attachment mechanism proximate the second end of the single support core.

In this embodiment, the first end cap arrangement includes a first end cap releasably secured to the first attachment mechanism axially located the first filtration stage filter media along the single support core and into axial compressed abutment with the intermediate seal arrangement. The second end cap arrangement includes a second end cap releasably secured to the second attachment mechanism axially locating the second filtration stage filter media along the single support core and into axial compressed abutment with the intermediate seal arrangement.

The filter assembly, immediately above, further includes a first cap plug axially interposed between the first end cap and an end of the single support core. A second cap plug is axially interposed between the second end cap and another end of the single support core. Each end cap plug is removably secured to the support core by one of the first and second end cap.

In another embodiment, the first filtration stage filter media includes a particulate media and the second filtration stage filter media includes a coalescing media.

In an additional embodiment of the filter assembly, the single support core includes a plurality of orifices defined and aligned circumferentially along the longitudinal length of the single support core. The single support core has a first plurality of portions defined between the first end cap arrangement and the intermediate annular seal and a second plurality of portions defined between the intermediate annular seal and the second end cap arrangement. Each of the first portions defined by the locations of the plurality of orifices along the core and with each of the second portions defined by the locations of the plurality of orifices along the core. The locations of the plurality of orifices in each of the first portions and second portions of the single support core are equidistant circumferentially from each other defining rings of the orifices in each of the portions. The rings are equidistant longitudinally from each other in each of the portions and the rings are longitudinally spaced differently in adjacent portions of each of the first and second plurality of portions of the single support core.

The plurality of orifices in the single support core are arranged directing fluid flow in a uniform media flex rate throughout the length of each of the filter media mounted on the single support core. The plurality of orifices are also arranged to direct fluid flow through the filter assembly such as to yield a high flow velocity in predetermined areas along the length of the filter assembly.

In another embodiment, the filter assembly further includes a characteristic of collapse when a pressure differential between the first filtration stage of filter media and the second filtration stage of filter media above a predetermined level. The filter assembly in one embodiment is structured not to collapse when the pressure differential is not less than five pounds per square inch. In another embodiment, the filter assembly is configured to collapse when the pressure differential is not less than fifteen pounds per square inch nor more than twenty-five pounds per square inch.

The filter assembly may include filter media of the first and second stages which are composed of the same material. In another embodiment, the support core of the filter assembly, including the plurality of orifices, is the sole apparatus directing fluid flow along the longitudinal length of the support core. The filter assembly disclosed herein can be disposed in a multi-stage filtration vessel. In another embodiment, the orifices of the plurality of orifices in the support core are non-circular.

There is further disclosed a single support core for a filter media assembly. The single support core includes a single longitudinal tube extending between a first end and a second end. A plurality of orifices are defined in the tube, the orifices align circumferentially along the longitudinal length of the tube. A first plurality of portions defined between the first end and an intermediate annular ring joint and a second plurality of portions defined between the intermediate annular ring joint and the second end. Each of the first portions defined by the locations of the plurality of orifices along the tube and with each of the second portions defined by the location of the plurality of orifices along the tube, with the orifices in each of the first portions and second portions are equidistance circumferentially from each other defining rings of the orifices in each of the portions. The rings are equidistant longitudinally from each other in each of the portions and the rings are longitudinally spaced differentially in the adjacent portions of each of the first and second plurality of portions of the tube.

The single support core for a filter media assembly also includes the plurality of orifices are arranged to direct fluid flow through the tube such as to yield a high flow velocity in predetermined areas along the length of the filter assembly.

The tube of the single support core has a diameter of between one and six inches and a length of 24 through and including a 120 inches. The support core tube is composed of a material having a nominal thickness of 0.02 through 0.10 inches thick along the entire length.

The single support core can be composed of a material that is one of a metal and a synthetic composite. In one embodiment, the support core tube is stainless steel. The tube of the single support core has orifices that are from 0.03 inches to 1.00 inches in diameter.

The tube of a single support core includes a characteristic of collapsibility of the tube under a predetermined pressure force.

It is also disclosed that the single support core of the filter assembly disclosed herein and the single longitudinal tube of the support core disclosed herein are re-useable.

The apparatus of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage. In another aspect, the invention provides.

BRIEF DESCRIPTION OF THE DRAWINGS

These and other advantages of the present disclosure are best understood with reference to the drawings, in which:

FIG. 1 is an exemplary embodiment of a filter assembly including a first and second filter media each compressably secured to a single support core between an end of the support core and an intermediate annular seal.

FIG. 2 is a cross-section view of the filter assembly illustrated in FIG. 1 along the line 2-2 of the single support core.

DETAILED DESCRIPTION OF THE INVENTION

Figure 3:
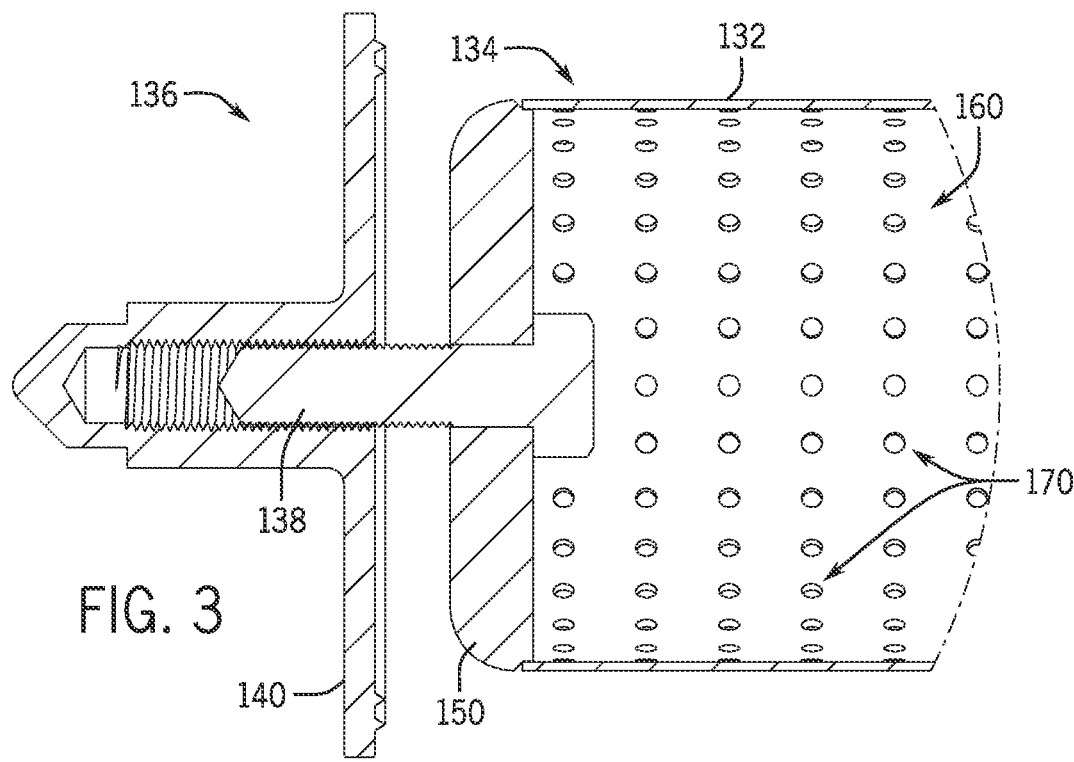
FIG. 3 is a detail view of the single support core illustrated in FIG. 2, at line 3-3, without a filter media mounted on the single support core.

Referring to the FIGS. 1-7, FIG. 7 of the drawings designate an exemplary embodiment of a multi-stage vessel 100 for filter assembly 130. The multi-stage vessel 100 has a generally tubular hull 102 with one end permanently enclosed by a preferably elliptical cap 104 and the opposing end enclosed by a conventional closure member, preferably quick opening closure 106. It should be understood that a plurality of filter assemblies 130 can be removably installed in the multi-stage vessel 100.

Figure 7:
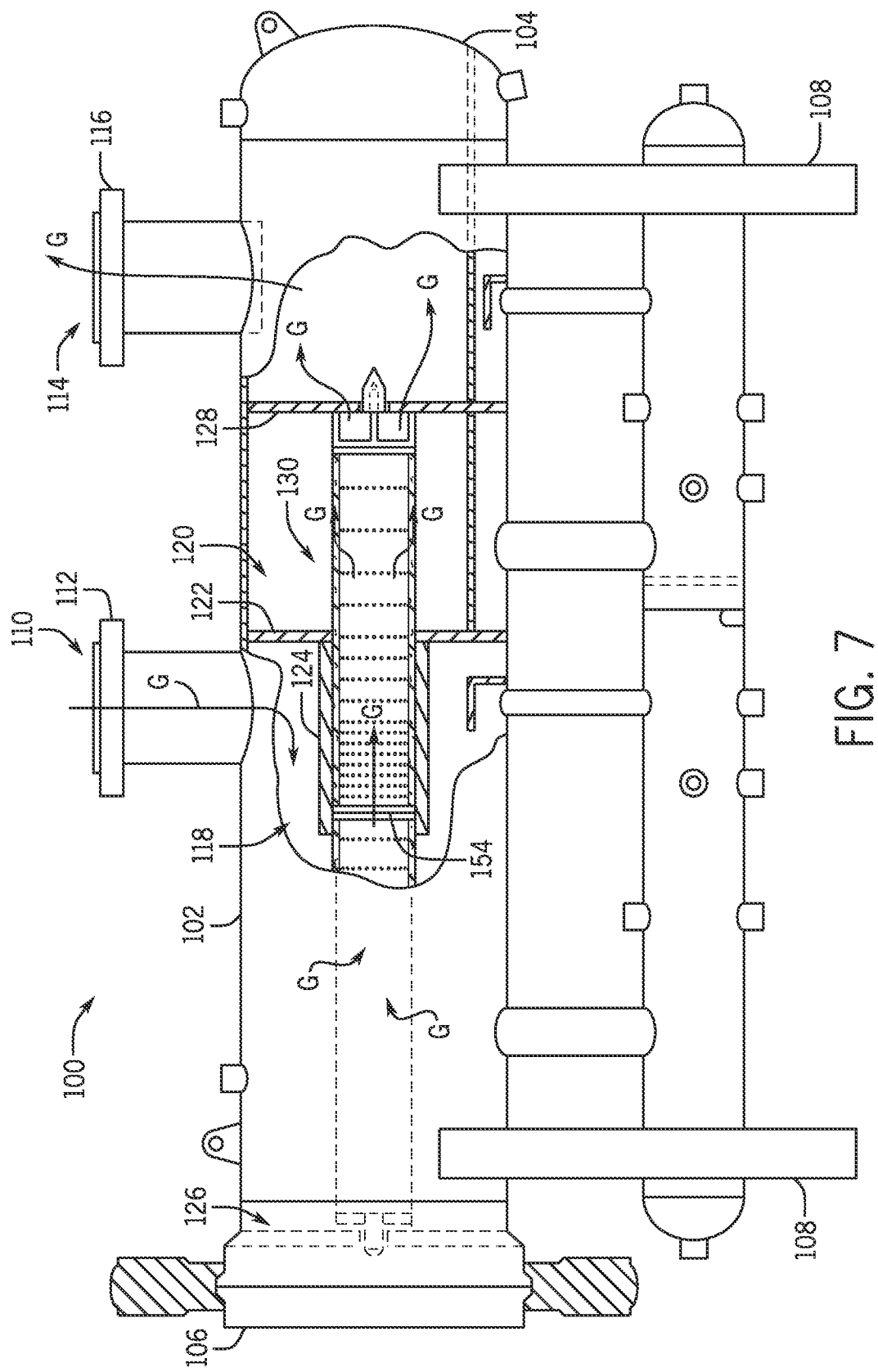
FIG. 7 is a side elevation view, in partial section, of an exemplary embodiment of a Gemini™ type multi-stage filter vessel with the filter assembly illustrated in FIGS. 1 and 2 installed in the vessel without a tubular baffle enclosing a portion of the filter assembly.

Referring now to FIG. 7 in the drawings, the multi-stage vessel 100 is shown divided into the first stage portion 118 and the second stage portion 120 by a partition, or tubesheet 122. Tubesheet 122 forms a fluid-tight seal around the interior wall of the hull 102 and has a plurality of annular guides 124 through which a filter assembly 130 extends from the first stage portion 118 to the second stage portion 120. The tubesheet 122 and the guides 124 are preferably made of steel.

The filter assembly 130 extend longitudinally along the length of the first stage portion 118 from a first stage support screen 126 to the tubesheet 122. The filter assembly 130 pass through the guides 124 of the tubesheet 122 and extend longitudinally along the length of the second stage portion 120 to a second stage support screen 128. An intermediate annular seal 154 coupled to the filter assembly 130 seals the annular guide 124 between the first stage 118 and second stage 120. The intermediate annular seal 154 also facilitates positioning of the filter assembly 130 in the opening defined in the annular guide 124 and tubesheet 122. First stage support screen 126 and second stage support screen 128 are both preferably made of a rigid material, such as steel or expanded metal, but are perforated to allow the gas stream to flow through them. The gas stream passes through an annular space between the second stage support screen 128 and the interior of the cap 104 prior to exiting through the outlet port 114.

Gas enters port 110 and is directed into the first stage portion 118. The gas then impacts the element guides 124. As the gas impacts guide 124, the gas is distributed across the open volume of the first stage portion 118 which slows the gas velocity allowing solids and liquid contaminants to fall out of the gas and drain, by gravity. This action separates some of the liquids and solids from the incoming gas stream and directs the gas stream over the filter assembly 130. In the first stage portion 118, the gas stream is forced through the filter assembly 130 from the outside to the inside. The filter assembly 130 trap solids and pre-coalescer liquids from the gas stream creating a pressure drop across the sidewalls of the filter assembly 130.

The selected density and porosity of filter media 172 mounted on a support core 132 of the filter assembly 130 prevents solids and bulk liquids from passing through the filter assembly 130 and into the second stage 120 of the multi-stage vessel 100.

The gas stream passes from the first stage portion 118 through the tubesheet 122 and into the second stage portion 120 along the interior of the filter assembly 130. In the second stage portion 130, the gas stream is forced through the sidewalls of the filter assembly 130 from the inside to the outside. The filter assembly 130 coalesces liquids from the gas stream creating a pressure drop across the sidewalls of the filter assembly 130.

A more complete description of the illustrated vessel 100 is in issued U.S. Pat. No. 6,168,647 which is incorporated herein, in its entirety, by this reference.

Referring to FIGS. 1 and 2, they illustrate a filter assembly 130. The filter assembly 130 includes a single support core 132 which extends between a first end 134 and a second end 142. The single support core 132 is composed of metal, synthetic material, or composite material, but the preferred embodiment of the support core 132 is stainless steel. The single support core 132 which is structured to support two filter media 172. The support core 132 is structured in various diameters and various lengths as desired by a user of the filter assembly 130. For example, the diameter of an exemplary embodiment of the single support core 132 can be anywhere from one inch to six inches and have a length from 24 inches to 120 inches. The filter assembly 130 is structured to fit within a multi-stage vessel 100 as illustrated in FIG. 7. The user of the filter assembly 130 would select filter assemblies 130 that would fit within the interior of the multi-stage vessel 100 for a particular location and filtering job. The thickness of the walls of the single support core 132 can range between 0.02 inches through 0.10 inches in thickness as determined by a user. It should be understood that the filter media 172 can be composed of the same material or it can be composed of a particulate media 156 or a coalescing media 158 as determined by a user of the filter assembly. Even though the single support core 132 is configured to support two filter media 172, the single support core 132 itself is a single unit.

The filter assembly 130 also includes an intermediate annular seal 154 which is positioned axially on the single support core 132 between the first end 134 and the second end 142. The intermediate annular seal 154 typically is positioned approximately midway between the first end and second end 134, 142 of the single support core 132. The intermediate annular seal 154 is coupled to the support core 132 by any convenient means, such as welding, crimping or other suitable fastener.

The filter assembly 130 also includes a first filtration stage of filter media 172 that is releasably mounted to the single support core 132 and sealed between the first end cap arrangement 136 and the intermediate seal 154. A second filtration stage filter media 172 is releasably mounted to the single support core 132 and sealed between the second end cap arrangement 144 and the intermediate seal 154. The first end cap arrangement 136 is operatively releasably secured to the first end 134 of the single support core 132. The second end cap arrangement 144 is operatively releasably secured to the second end 142 of the single support core 132.

The filter assembly 130 is structured to be reusable in the multi-stage filtration vessel 100. As such, it can be removed with the one or both of the filter media 172 replaced and sealed as described above and as further described below and reinserted into the multi-stage filtration vessel 100.

Figure 4:
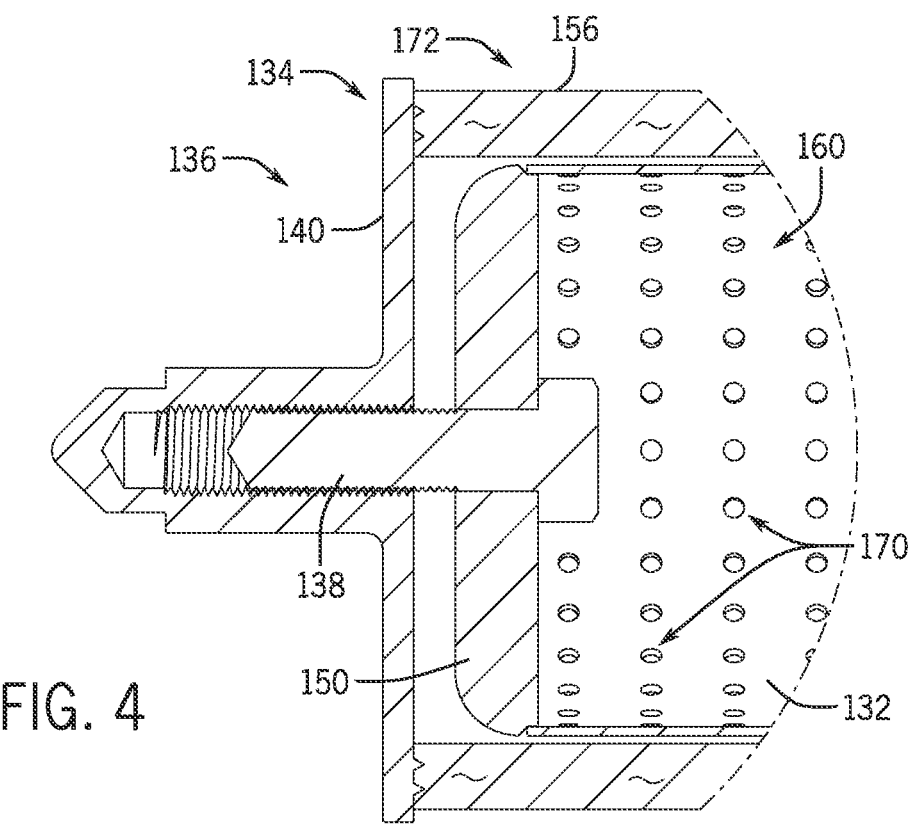
FIG. 4 is a detail view of the single support core illustrated in FIG. 2, at line 4-4, with a filter media mounted on the single support core with an end cap arrangement applying a compression force on the filter media.
Figure 5:
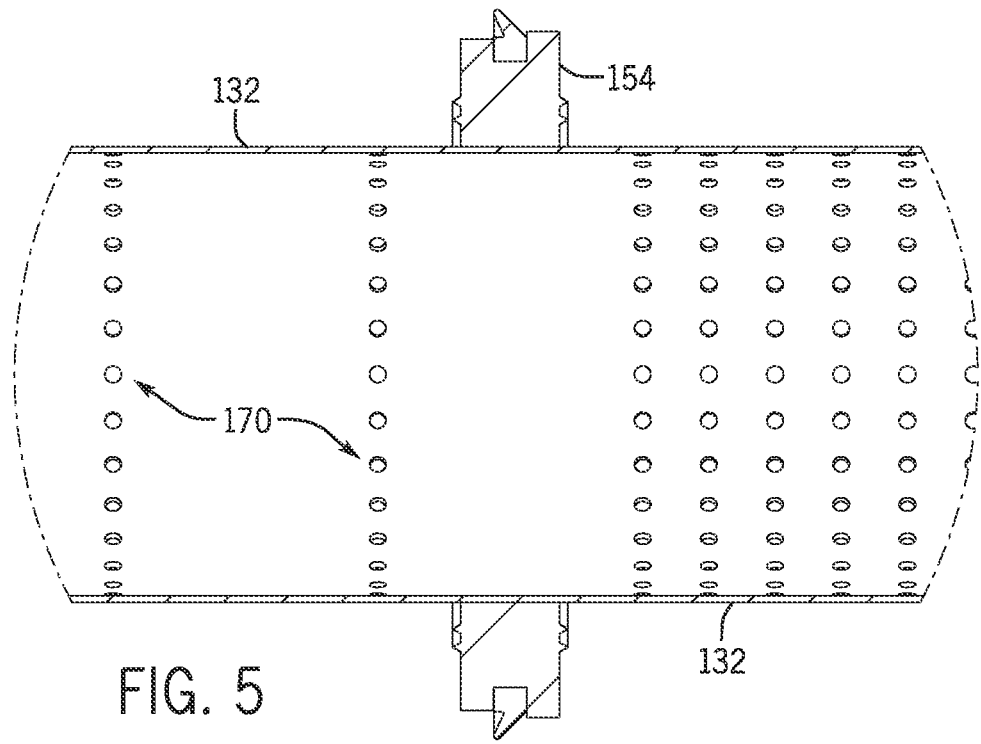
FIG. 5 is a detail view of the single support core illustrated in FIG. 2, at line 5-5, without a filter media mounted on the single support core and with an intermediate annular seal coupled to the single support core proximate a mid-point of the single support core length.
Figure 6:
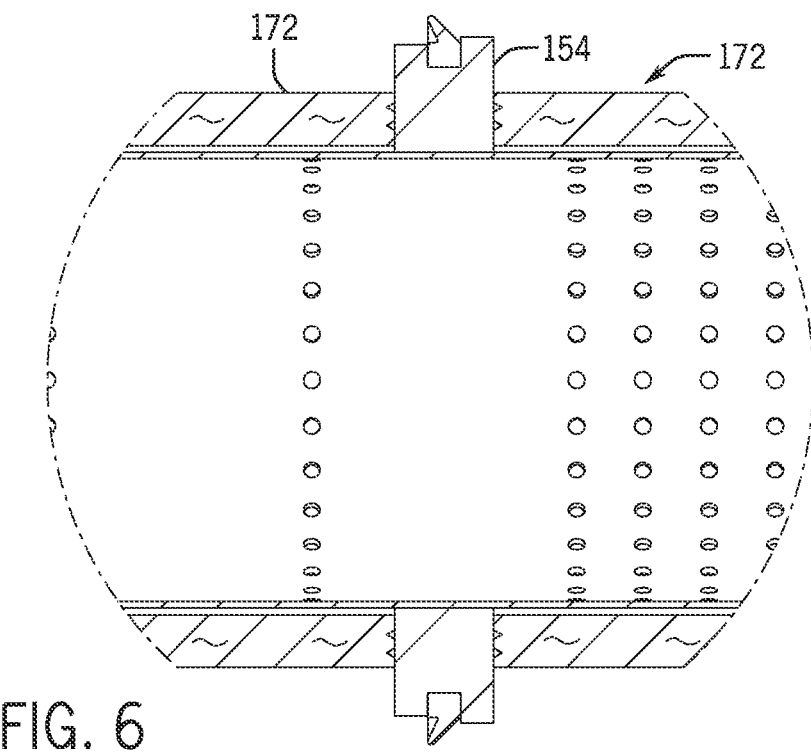
FIG. 6 is a detail view of the single support core illustrated in FIG. 2, at line 6-6, with a pair of filter media mounted on the single support core and compressably coupled to each side of the intermediate annular seal by an end cap arrangement, illustrated in FIG. 4, operatively releasably secured to each end of the single support core as illustrated in FIG. 2.

Referring to FIGS. 3 and 4, there is illustrated a first end cap arrangement 136. A first attachment mechanism 138, for example a threaded bolt, is coupled to a first cap plug 150 and coupled to the single support core 132. The first attachment mechanism 138 extends away from the first cap plug 150 and engages a first end cap 140. The end cap 140 is structured to be releasably secured to the first attachment mechanism 138 and axially locating the first filtration filter media 172 along the single support core 132 and into axial compressed abutment with the intermediate seal arrangement 154. FIG. 3 illustrates the structure of the end cap 140, support core 132 and the first attachment mechanism 138 without the filter media 172. FIG. 4 illustrates the same elements but with the filter media 172, for example the particulate media 156 mounted on the single support core 132 with the first end cap 140 threaded onto the first attachment mechanism 138 with the end cap 140 engaging the filter media 172 and compressing the filter media 172 against the intermediate annular seal 154 (see FIGS. 2 and 6).

It should be noted that the above description of the first attachment mechanism 138 is identical to a second attachment mechanism 146 on the other, second end 142 of the single support core 132 (see FIG. 2). A second end 142 of the single support core 132 includes a second end cap 142, a second cap plug 152, and releasably secures a second filter media 172 between the second end cap 148 and the intermediate annular seal 154. See FIGS. 2 and 6.

The filter assembly 130 as disclosed herein, utilizing a reusable support core 132, allows the filter assembly 130 to be configured to adjust filtering and coalescing performance in a multi-stage filtration vessel 100 to work with different contaminant and contaminant loadings. As will be explained below, the reusable support core includes a plurality of orifices 160 which are arranged to optimize solids loading and droplets with coalescing and conditioning the second stage of the multi-stage filtration vessel 100 to eliminate the need of a flow conditioning screen, for example a louvered impingement baffle, which is used in some multi-stage filtration vessels. The elimination of a louvered impingement baffle will save costs not only for materials but also for maintenance of the multi-stage filtration vessel 100.

Referring now to FIGS. 2-6, there is disclosed a plurality of orifices 160 defined in the single support core 132. The orifices 160 are aligned circumferentially along the longitudinal length of the single support core 132. The plurality of orifices are aligned as rings 170 at specific locations along the longitudinal length of the single support core 132 for both a first plurality of portions 162 and a second plurality of portions 166. The first plurality of portions 162 are defined between the first end cap arrangement 136 and the intermediate annular seal 154, with the second plurality of portions 166 defined between the intermediate annular seal 154 and the second end cap arrangement 144. (See FIG. 2). The first plurality of portions 162 are defined by the locations of the plurality of orifices 164 with each of the second plurality of portions 166 defined by the locations of the plurality of orifices 168 along the single support core 132. (See FIG. 2).

The plurality of orifices 160 in each of the first plurality of portions 162 and the second plurality of portions 166 are equidistant circumferentially from each other and defined the rings of orifices 170 in each of the portions 162, 166. See FIGS. 2, 3, and 4. The rings 170, in each of the portions, are equidistant longitudinally from each other but the rings are longitudinally spaced differently in adjacent portions 172, 174, 176, and 178 of each of the first and second plurality of portions 162, 166 of the single support core 132.

Referring to FIG. 2 the plurality of orifices 160 in portion 172 of the first plurality of portions 162 are equidistant longitudinally from each other, which is similar to the longitudinal spacing of the rings of orifices 170 in the other portions 174, 176, 178 of orifices as illustrated in FIG. 2. However, the distance between each of the rings of orifices 170 in their respective portions are different from an adjacent portion. For example, the distance between each of the rings of orifices 170 in portion 172 is different from the longitudinal distance between the rings of orifices 170 in portion 174 which are different from the longitudinal distance between the ring of orifices 170 in portion 176 which are also different from the longitudinal distance between the ring of orifices in portion 178.

As illustrated in FIG. 2, the distance between the respective rings of orifices 170 increases along the length of the first plurality of portions 162 between the first end 134 of the single support core 132 and the intermediate seal 154. It should be noted that the same arrangement is established in the second plurality of portions 166 of the single support core 132.

In an exemplary embodiment, the distance between rings of orifices 170 in portion 171 is 0.05 inches; the distance between rings of orifices 170 in portion 174 is 1.00 inches; the distance between rings of orifices 170 in portion 176 is 1.50 inches; and the distance between rings of orifices 170 in portion 178 is 2.0 inches. The distance between rings of orifices 170 in corresponding portions in each of portions 162 and 166 are the same, however, in some embodiments the distance between rings of orifices 170 in portions 162 and 166 may be different as determined by the user. A typical distance between orifices, circumferentially, in each of the rings of orifices 170 is 0.125 inches.

It should also be noted that the number of rings of orifices 170 in each of the portions 172, 174, 176, and 178 may vary as determined by a user to provide varying porosity throughout the length of the single support core 132 to direct gas flow through the multi-stage filtration vessel 100 to provide a uniform media flux rate throughout the length of the filter media. The perforation of orifices and their arrangement along the longitudinal length of the support core direct gas flow through the single support core 130 to yield a higher velocity in certain areas along the length of the tube thereby controlling the gas flow and pressures.

The filter assembly 130 as determined by the thickness of the support core 132 and the arrangement of the plurality of orifices 160 results in a characteristic of collapsibility such that when a pressure differential between the first filtration stage 118 of the filter media 172 and the second filtration stage 120 of filter media 172 exceeds a predetermined level. In one embodiment, the pressure differential is not less than five pounds per square inch and in another embodiment the pressure differential is not less than fifteen pounds per square inch nor more than 25 pounds per square inch such that the characteristic of collapsibility by pressure will collapse a portion of the support core if a pressure exceeds the highest pressure for which the support core is structured which protects the multi-stage filtration vessel and its non-removably internal elements. The collapsed portion of the single support core 132 allows the gas to flow substantially unimpeded from the inlet port 110 to the outlet port 114 of the multi-stage vessel 100.

The plurality of orifices 160 illustrated in FIGS. 2-6 are circular, however, it is contemplated that the plurality of orifices 160 may be noncircular as determined by the manufacturer or user of the filter assembly 130 for use in a particular multi-stage filtration vessel 100. For example, orifices may be defined as oval shaped, slots, or polygon shape.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present disclosure has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the filter media support member as described herein may be made, none of which depart from the spirit or scope of the present disclosure. The particular embodiments and applications were chosen and described to provide the best illustration of the principles of the filter media support member and its practical application to thereby enable one of ordinary skill in the art to utilize the support member in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly comprising:
    a single support core extending between a first end and a second end;
    a first end cap arrangement operatively releasably secured to the first end of the single support core;
    a second end cap arrangement operatively releasably secured to the second end of the single support core;
    an intermediate annular seal positioned axially on the single support core between the first and second ends;
    a first filtration stage of filter media releasably mounted to the single support core sealed between the first end cap arrangement and the intermediate seal; and
    a second filtration stage of filter media releasably mounted to the single support core sealed between the second end cap arrangement and the intermediate seal.

2. The filter assembly of claim 1, further including a first attachment mechanism proximate the first end of the single support core and a second attachment mechanism proximate the second end of the single support core; and
    wherein the first end cap arrangement includes a first end cap releasably secured to the first attachment mechanism axially locating the first filtration stage filter media along the single support core and into axial compressed abutment with the intermediate seal arrangement;
    wherein the second end cap arrangement includes a second end cap releasably secured to the second attachment mechanism axially locating the second filtration stage filter media along the single support core and into axial compressed abutment with the intermediate seal arrangement.

3. The filter assembly of claim 2, further including a first cap plug axially interposed between the first end cap and an end of the single support core, and a second cap plug axially interposed between the second end cap and another end of the single support core.

4. The filter assembly of claim 3, wherein each cap plug is removably secured to the support core by one of the first and second end cap.

5. The filter assembly of claim 1, wherein the first filtration stage filter media includes a particulate media and the second filtration stage filter media includes a coalescing media.

6. The filter assembly of claim 1, further comprising a plurality of orifices defined in the single support core, the orifices aligned circumferentially along the longitudinal length on the single support core.

7. The filter assembly of claim 6, wherein the single support core configured with a first plurality of portions defined between the first end cap arrangement and the intermediate annular seal and a second plurality of portions defined between the intermediate annular seal and the second end cap arrangement, with each of the first portions defined by the locations of the plurality of orifices along the core and with each of the second portions defined by the locations of the plurality of orifices along the core.

8. The filter assembly of claim 7, wherein the locations of the plurality of orifices in each of the first portions and second portions of the single support core are equidistant circumferentially from each other defining rings of the orifices in each of the portions,
    wherein the rings are equidistant longitudinally from each other in each of the portions, and
    wherein the rings are longitudinally spaced differently in adjacent portions of each of the first and second plurality of portions of the single support core.

9. The filter assembly of claim 6, further comprising the plurality of orifices arranged directing fluid flow in a uniform media flux rate throughout the length of each of the filter media mounted on the single support core.

10. The support core of claim 9, wherein the orifices of the plurality of orifices are non-circular.

11. The filter assembly of claim 6, wherein the plurality of orifices are arranged to direct fluid flow through the filter assembly such as to yield a high flow velocity in predetermined areas along the length of the filter assembly.

12. The filter assembly of claim 6, further comprising:
    the support core, including the plurality of orifices, is the sole apparatus directing fluid flow along the longitudinal length of the support core.

13. The filter assembly of claim 1, further includes a characteristic of collapsibility when a pressure differential between the first filtration stage of filter media and the second filtration stage of filter media above a predetermined level.

14. The filter assembly of claim 13, wherein the pressure differential is not less than 5 PSI.

15. The filter assembly of claim 14, wherein the pressure differential is not less than 15 PSI nor more than 25 PSI.

16. The filter assembly of claim 1, wherein the filter media of the first and second stages are composed of the same material.

17. The filter assembly of claim 1, wherein the filter assembly is disposed in a multi-stage filtration vessel.

18. The filter assembly of claim 1, wherein the single support core is re-useable.

19. A single support core for a filter media assembly, the single support core comprising:
    a single longitudinal tube extending between a first end and a second end;

a plurality of orifices defined in the tube, the orifices aligned circumferentially along the longitudinal length of the tube; and a first plurality of portions defined between the first end and an intermediate annular ring joint and a second plurality of portions defined between the intermediate annular ring joint and the second end, with each of the first portions defined by the locations of the plurality of orifices along the tube and with each of the second portions defined by the locations of the plurality of orifices along the tube, with the orifices in each of the first portions and second portions equidistant circumferentially from each other defining rings of the orifices in each of the portions, wherein the rings are equidistant longitudinally from each other in each of the portions, and wherein the rings are longitudinally spaced differently in adjacent portions of each of the first and second plurality of portions of tube.

20. The single support core for a filter media assembly of claim 19, further comprising the plurality of orifices are arranged to direct fluid flow through the tube such as to yield a high flow velocity in predetermined areas along the length of the filter assembly.

21. The single, support core of claim 20, wherein the single longitudinal tube, including the plurality of orifices, is the sole apparatus directing fluid flow along the longitudinal length of the support core.

22. The single support core of claim 20, wherein the orifices of the plurality of orifices are non-circular.

23. The single support core for a filter media assembly of claim 19, wherein the tube has a diameter of between 1 and 6 inches and a length of 24 through and including 120 inches.

24. The single support core for a filter media assembly of claim 19 wherein the tube is composed of a material having a nominal thickness of 0.02 through 0.10 inches thick along the entire length.

25. The single support core for a filter media assembly of claim 24, wherein the material is one of a metal and a synthetic composite.

26. The single support core for a filter media assembly of claim 25, wherein the material is stainless steel.

27. The single support core for a filter media assembly of claim 19, wherein the orifices are from 0.03 inches to 1.00 inches in diameter.

28. The single support core for a filter media assembly of claim 19, further comprising a first filter media releasably mounted to the tube and sealed between a first end cap arrangement proximate the first end of the tube and the intermediate annular ring joint; and a second filter media releasably mounted to the tube and sealed between a second end cap arrangement proximate the second end of the tube and the intermediate annular ring joint.

29. The single support core for a filter media assembly of claim 28, wherein the first filter media and second filter media are composed of the same material.

30. The single support core for a filter media assembly of claim 19, including a characteristic of the tube, with the characteristic being a collapse of the tube under a predetermined pressure force.

31. The single support core for a filter media assembly of claim 30, wherein the pressure force is not less than 5 PSI.

32. The single support core for a filter media assembly of claim 30, wherein the pressure force is not less than 15 PSI nor more than 25 PSI.

33. The single support core of claim 19, wherein the filter assembly is disposed in a multi-stage filtration vessel.

34. The the support core of claim 19, wherein the single longitudinal tube is re-useable.

* * * * *